(12) United States Patent
Yang

(10) Patent No.: US 10,421,669 B2
(45) Date of Patent: Sep. 24, 2019

(54) DISSOLVED AIR FLOTATION DEVICE

(71) Applicants: Shi Chun Yang, Ulsan (KR); Korea Aquosys Co., Ltd., Ulsan (KR)

(72) Inventor: Shi Chun Yang, Ulsan (KR)

(73) Assignee: KOREA AQUOSYS CO., LTD. (KR)

( * ) Notice: Subject to any disclaimer, the term of this patent is extended or adjusted under 35 U.S.C. 154(b) by 996 days.

(21) Appl. No.: 14/781,620

(22) PCT Filed: Jun. 20, 2014

(86) PCT No.: PCT/KR2014/005476
§ 371 (c)(1),
(2) Date: Oct. 1, 2015

(87) PCT Pub. No.: WO2015/002397
PCT Pub. Date: Jan. 8, 2015

(65) Prior Publication Data
US 2016/0060137 A1 Mar. 3, 2016

(30) Foreign Application Priority Data

Jul. 4, 2013 (KR) .................. 10-2013-0078561

(51) Int. Cl.
*C02F 1/24* (2006.01)
*C02F 1/52* (2006.01)
(Continued)

(52) U.S. Cl.
CPC ............. *C02F 1/24* (2013.01); *B03D 1/1418* (2013.01); *B03D 1/1431* (2013.01);
(Continued)

(58) Field of Classification Search
CPC .................................................... B03D 1/1418
See application file for complete search history.

(56) References Cited

U.S. PATENT DOCUMENTS

| 4,043,912 A * | 8/1977 | Bascope | ............ | B01D 17/0205 |
| | | | | 210/537 |
| 5,510,039 A | 4/1996 | Bassler et al. | | |

(Continued)

FOREIGN PATENT DOCUMENTS

| CN | 102056673 A | 5/2011 |
| EP | 2305386 A2 | 4/2011 |

(Continued)

OTHER PUBLICATIONS

European Office Action (14 819 380.8-1101), EPO, dated Mar. 29, 2018.

(Continued)

*Primary Examiner* — Thomas M Lithgow
(74) *Attorney, Agent, or Firm* — Park & Associates IP Law, P.C.

(57) ABSTRACT

Disclosed is a dissolved air floatation device which includes a cyclonic flotation separation tank, arranges a return pipe for treated water and a return pipe for floating scum concentrically with respect to the center pipe of a swirling flow within the floatation separation tank, forms a descending water flow along with an ascending water flow within the flotation separation tank, thereby being capable of simultaneously separating settled suspended material and floating suspended material in raw water at an improved efficiency.

5 Claims, 7 Drawing Sheets

(51) Int. Cl.
*C02F 1/38* (2006.01)
*B03D 1/14* (2006.01)
*C02F 1/56* (2006.01)

(52) U.S. Cl.
CPC .............. *B03D 1/1443* (2013.01); *C02F 1/38* (2013.01); *C02F 1/5281* (2013.01); *C02F 1/5245* (2013.01); *C02F 1/56* (2013.01); *C02F 2201/003* (2013.01); *C02F 2209/40* (2013.01); *C02F 2209/42* (2013.01); *C02F 2301/026* (2013.01)

(56) References Cited

U.S. PATENT DOCUMENTS

| 8,349,177 B2 | 1/2013 | Menju et al. |
| 2004/0035799 A1 | 2/2004 | Smith et al. |
| 2011/0084012 A1 | 4/2011 | Yang et al. |

FOREIGN PATENT DOCUMENTS

| JP | 8108173 A | 4/1996 |
| JP | 11-000651 A | 1/1999 |
| JP | 20019446 A | 1/2001 |
| JP | 2009-056426 A | 3/2009 |
| JP | 2010-094594 A | 4/2010 |
| JP | 2010527787 A | 8/2010 |
| KR | 20030028193 A | 4/2003 |
| KR | 1020040001188 A | 1/2004 |
| KR | 1020050019343 A | 11/2005 |
| KR | 100990913 B1 | 11/2010 |
| WO | 91/01276 A1 | 2/1991 |
| WO | 1991-001276 A1 | 2/1991 |
| WO | 2009148265 A2 | 12/2009 |

OTHER PUBLICATIONS

European Search Report (EP 14819380), EPO, dated Jan. 2, 2017.
Japanese Office Action (JP 2016-523635), JPO, dated Feb. 7, 2017.
Saudi Arabian Office Action (SA 516370346), Saudi Patent Office, dated Feb. 9, 2017.
Chinese Office Action, Chinese Intellectual Property Office, dated Jul. 19, 2016.

* cited by examiner

DISSOLVED AIR FLOTATION DEVICE

CROSS-REFERENCE TO RELATED APPLICATIONS

This application is the United States national phase of International Application No. PCT/KR2014/005476 filed Jun. 20, 2014, and claims priority to Korean Patent Application No. 10-2013-0078561 filed Jul. 4, 2013, the disclosures of which are hereby incorporated in their entirety by reference.

TECHNICAL FIELD

The present invention relates to a dissolved air flotation device used for solid-liquid separation in a water treatment process and, more particularly, to a dissolved air flotation device for water treatment that is capable of separating suspended material or surfactants from raw water in which suspended material or surfactants are present in the form of emulsion or suspension.

BACKGROUND ART

In water treatment, a device that uses one or more separation methods out of sedimentation, floatation, and filtration is typically used to separate suspended material from water.

Sedimentation separation is a separation method of separating suspended material from raw water and thus producing treated water by using a density difference between suspended material and water. This method includes the steps of introducing raw water into a sedimentation tank, settling large-sized suspended material that has a higher density than water, and obtaining the supernatant in the sedimentation tank as treated water. In this method, settling speed of suspended material depends on a density or particle size of the material to be separated. Typically, gravity sedimentation or flocculating sedimentation is usually used.

Sedimentation separation is disadvantageous over other separation methods because of low separation speed which is attributable to a long settling time (i.e. about 3 to 6 hours). For this reason, a large sedimentation tank is needed. To increase the settling speed, a plate settler or tube settler is used. However, the use of a plate settler or tube settler adds complexity to equipment or facilities of a water plant and does not sufficiently increase the settling speed. That is, although a plate settler or tube settler is used to increase setting speed, 1 hour of retention time is still required. On the other hand, when the usage of flocculants is increased to improve settling time, a total amount of sediment correspondingly increases. That is, the amount of waste sludge to be disposed increases.

Filtration separation is a separation method of removing suspended material from water by making water pass through a vessel filled with a filter medium, a sieve of close mesh, a filter cloth, or a porous ceramic product. This method is useful for removal of certain material. However, this method has the disadvantages of complicated regeneration work such as backwashing and of high cost attributable to the limited lifespan of filter media.

Flotation separation is a separation method of separating suspended material with a lower density than water by floating the suspended material to the surface of water. This method was first used in ore dressing to separate a metal from ore in the mining industry in 1920s. Then, this method was used to separate pulp in paper manufacturing, used for water treatment in the Republic of South Africa in 1960s, and used later in Scandinavia and other Europe countries.

Since then, the technology of a flotation separation method using dissolved air has been continuously developed in many aspects. As a result, so-called dissolved air flotation, which increases the content of dissolved air in water by pressurizing air, is now a representative solid liquid separation technology. The dissolved air flotation can make material with a higher density than water float to the surface of water along with micro-air bubbles as well as material with a lower density than water. Furthermore, it normally takes only 0.5 to 1 hour to separate and remove suspended material. Therefore, this method is advantageous over a sedimentation separation device in terms of the size of facilities. However, this method also has a disadvantage that a portion of suspended material is resettled on the bottom of a separation tank or transferred to a next process.

In order to solve the problems of the dissolved air flotation method, conventional dissolved air flotation devices that are currently used are equipped with a scrapper driven by a motor on the bottom of a separation tank, thereby collecting settled suspended materials and discharging the collected sludge. However, the addition of a scrapper increases the total cost of equipment, makes operation of equipment more complicated, and cannot entirely remove the sludge. Therefore, it is not effective to remove suspended material that still remains in a separation tank after flotation separation.

A patent document (U.S. Pat. No. 8,349,177) discloses a technology by which: treated water is swirled in a flotation separation tank to increase separation speed of suspended material; two discharge holes are provided to upper and lower portions of the flotation separation tank to discharge scum (froth) and sediments (sludge), respectively; and an umbrella-shaped cover board is installed between a scum discharge pipe and a treated water discharge pipe to prevent floated suspended material from being introduced into a treated water discharge pipe, thereby improving separation performance of suspended material and increasing removal efficiency of sediments. The device disclosed in the patent document has a problem that a scum discharge pipe, a cover board, and a treated water discharge pipe inhibit formation and movement of a swirling flow within a cylindrical separation tank. That is, the device forms turbulent flows in the separation tank, impeding flotation or sedimentation of suspended material. In addition, when water flows within a separation tank, it prevents cross flows in a vertical direction within the separation tank and allows only a descending flow, impeding flotation speed of suspended material and reduces chances of increasing activity of air bubbles in suspended material-air bubble bodies in which suspended material and air bubbles are repeatedly attached to and detached from each other in a dissolved air flotation process.

Dissolved air flotation can remove suspended material using a characteristic that suspended material such as synthetic detergents, softening agents, or proteins gather around the surface of air bubbles or oil when the suspended material exists in water. Since adsorption and removal of suspended material is possible in this way, removal efficiency of suspended material can be increased.

DISCLOSURE

Technical Problem

Accordingly, the present invention has been made keeping in mind the above problems occurring in the prior art, and an object of the present invention is to provide a dissolved air flotation device that is capable of increasing flotation efficiency of contaminants that can be floated and of easily removing sediment when removing contaminants such as suspended material or surfactant.

Technical Solution

In order to accomplish the above objects, according to one aspect, there is provided a dissolved air flotation device, including: a raw water supply means that adjusts a flow rate of raw water supplied; a separation tank having a raw water inlet (see reference numeral 11a in FIG. 2) to which a raw water inflow pipe is connected such that raw water supplied by the raw water supply means swirls and flows in a predetermined direction within the separation tank while the raw water is introduced into the separation tank, a treated water outlet (see reference numeral 11b) to which a treated water outflow pipe that vertically extends is connected, and a sediment discharge outlet (see reference numeral 11c) through which sediments (see reference numeral 113a in FIG. 5) on a bottom of the separation tank are discharged outside; a scum outflow pipe that vertically extends through the separation tank; and an air supply means that supplies air bubbles to the separation tank, wherein the separation tank, the treated water outflow pipe, and the scum outflow pipe all have a circular cross section and are concentrically arranged with respect to a center of a swirling flow formed in the separation tank.

The dissolved air flotation device may further include: a treated water outflow adjustment means that adjusts a flow rate of treated water discharged from the separation tank; and a sediment discharge adjustment means that adjusts a flow rate of sediments discharged from the separation tank, wherein an upper end of the scum outflow pipe is located under a surface of water within the separation tank.

The raw water inlet is located at a height which is 10 to 60% of a total height from the sediment discharge outlet to the upper end of the scum outflow pipe.

The dissolved air flotation device may further include a rotatable scrapper that collects scum floating above the scum outflow pipe.

The dissolved air flotation device may further include a water treatment chemical supply means connected to the raw water inflow pipe.

Advantageous Effects

An embodiment of the present invention can separate and remove contaminants in water at an improved efficiency by using a method in which: a mixture of raw water and air bubbles introduced into a separation ascends while forming a swirling flow around the wall of the separation tank; contaminants and air bubbles that can be floated are gathered at the surface of water and then removed after being floated; treated water forms a descending swirling at a center portion of the separation tank and is discharged through an outflow pipe that is concentrically arranged with an axis of a swirling flow; and high-density material that cannot be floated is settled toward an outside of a central axis of an ascending swirling flow and descending swirling flow and then discharged through a sediment discharge pipe.

BEST MODE

Hereinafter, preferred embodiments of the present invention will be described with reference to the accompanying drawings.

A dissolved air flotation device according to the present invention is a purification and treatment apparatus that removes suspended material from drinking water, sea water, waste water, or process water.

Figure 1:
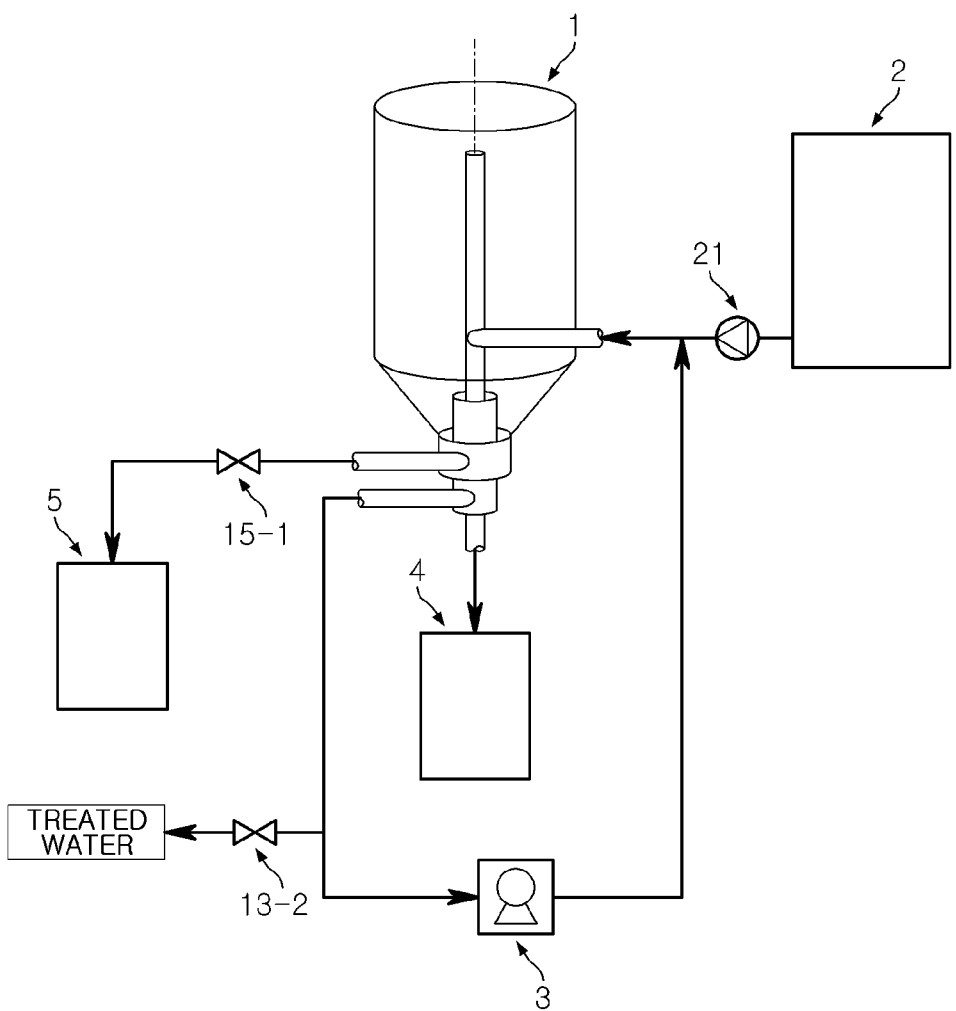
FIG. 1 is a block diagram illustrating a dissolved air flotation device according to a first embodiment of the present invention.
Figure 2:
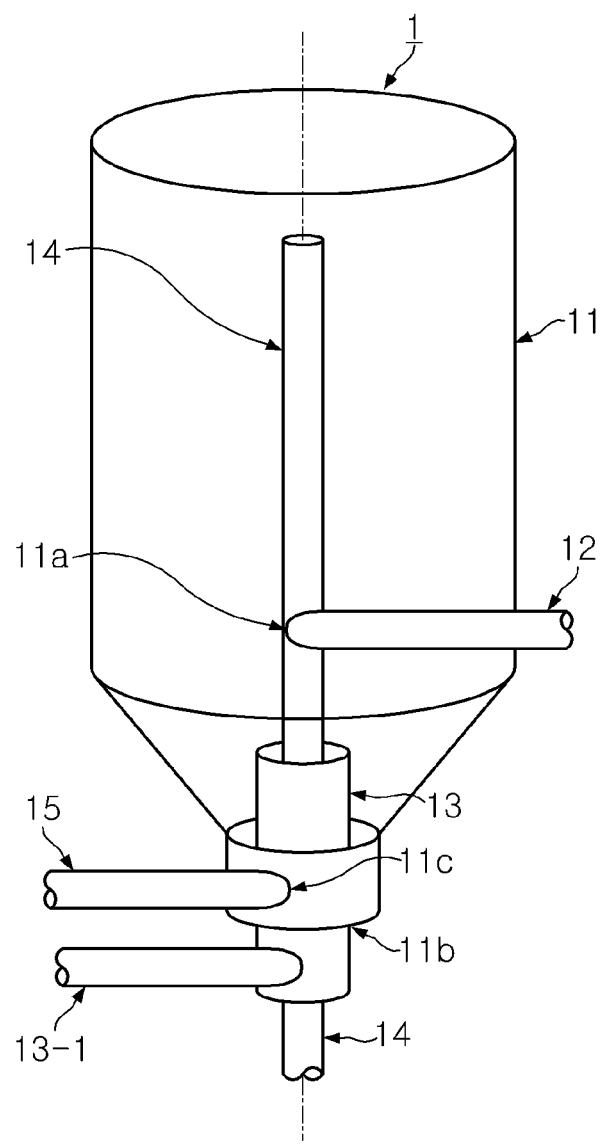
FIG. 2 is a perspective view illustrating a separation tank of FIG. 1.
Figure 3:
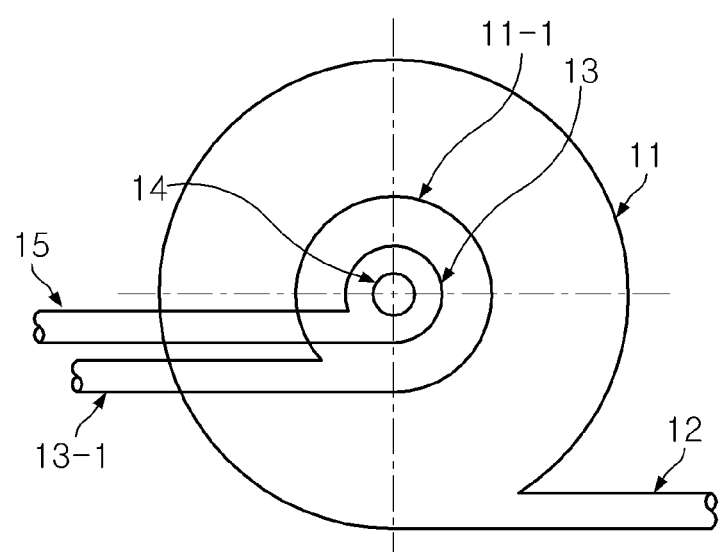
FIG. 3 is a plan view illustrating the separation tank of FIG. 2.

FIG. 1 is a block diagram illustrating a dissolved air flotation device according to a first embodiment of the present invention. FIGS. 2 and 3 are a perspective view and a plan view, respectively, of a separation tank of FIG. 1.

As illustrated in FIGS. 1 through 3, the dissolved air flotation device according to the first embodiment of the present invention includes a raw water pump 21 that pumps water (hereinafter referred to as raw water) stored in a raw water tank 2 and that includes a raw water inflow adjustment means, a separation tank 11 in which suspended material and water are separated from each other, a raw water supply pipe 12 that transports raw water pumped by the raw water pump 21 to the separation tank 11, a bubble supplier 3 that supplies air bubbles to the raw water flowing along the raw water supply pipe 12, a treated water outflow pipe 13 that discharges treated water outside the separation tank, a treated water outflow pipe 13 and a treated water outflow adjustment plate 13-2 that discharge treated water that remains after suspended material is removed, a sediment discharge pipe 15 that discharges sediments (sludge) that settles on the bottom of the separation tank, a sediment discharge adjustment plate 15-1, a sediment tank 5, a scum outflow pipe 14 that guides and discharges floated scum to the outside of the separation tank 11, and a scum tank 4.

The raw water inflow pipe 12 is connected to an raw water inlet 11a of the separation tank 11 in a way that the raw water inlet 11a is opened in a direction of tangent with respect to the body of the separation tank 11 such that a swirling flow of raw water is formed in the separation tank 11. Preferably, a connection end of the raw water inflow pipe 12 is located at a height which is 5 to 60% of the water level in the separation tank 11 so that an ascending swirling flow can be easily formed. The sediment discharge pipe 15 is connected to a lower end portion 11-1 of the separation tank 11 and the treated water outflow pipe 13 is installed to extend in a direction perpendicular to the body of the separation tank 11. An upper end of the treated water outflow pipe 13 to which treated water is introduced from the separation tank 11 is preferably positioned at a height which is 5 to 50% of the water level in the separation tank 11 in order to easily form a descending swirling flow of treated water and prevent overflowing of sediments. The scum outflow pipe 14 vertically extends in the separation tank 11 and passes through the center of the treated water outflow pipe 13. That is, the treated water outflow pipe 13 and the scum outflow pipe are unified as a double pipe. A space that serves as an outflow path is formed between the treated water outflow pipe 13 and the scum outflow pipe 14. The separation tank 11, the treated water outflow pipe 13, and the scum outflow pipe 14 all have a circular cross section and are concentrically arranged around the same axis (See FIG. 3). Preferably, the sediment discharge pipe 15 and a rear end 13-1 of the treated water outflow pipe are connected to the treated water outflow pipe 13 in a tangent direction within the separation tank 11 to form a swirling flow in the separation tank 11. When the water level in a raw water source such as the raw water tank 2 is sufficiently higher than the water level in the separation tank 11, the raw water pump 21 may be omitted because raw water can move into the separation tank 11 by gravitational flowing. In this case, only a raw water inflow adjustment means such as an adjustment valve may be provided.

As for the separation tank 11, an upper portion thereof has a cylinder shape, a middle portion thereof has a reversed conical shape (tapered to a lower side), and a lower portion thereof has a cylinder shape smaller than the upper portion. This structure facilitates formation of a swirling flow in the separation tank 11 and is advantageous in terms of removal of sediments (sludge). The bubble supplier 3 preferably supplies air bubbles with a size of 10 to 100 μm in a proportion of 5 to 40% with respect to the amount of raw water using air pressurized water having a pressure of 0.2 to 0.6 MPa. When the concentration of suspended material in raw water is increased to 1% or higher with respect to the amount of raw water, the proportion of air pressurized water that is supplied to raw water needs to be increased. Besides air, oxygen, nitrogen, carbon dioxide, or ozone that have a relatively low solubility with respect to water may be alternatively used to supply bubbles to raw water.

Figure 4:
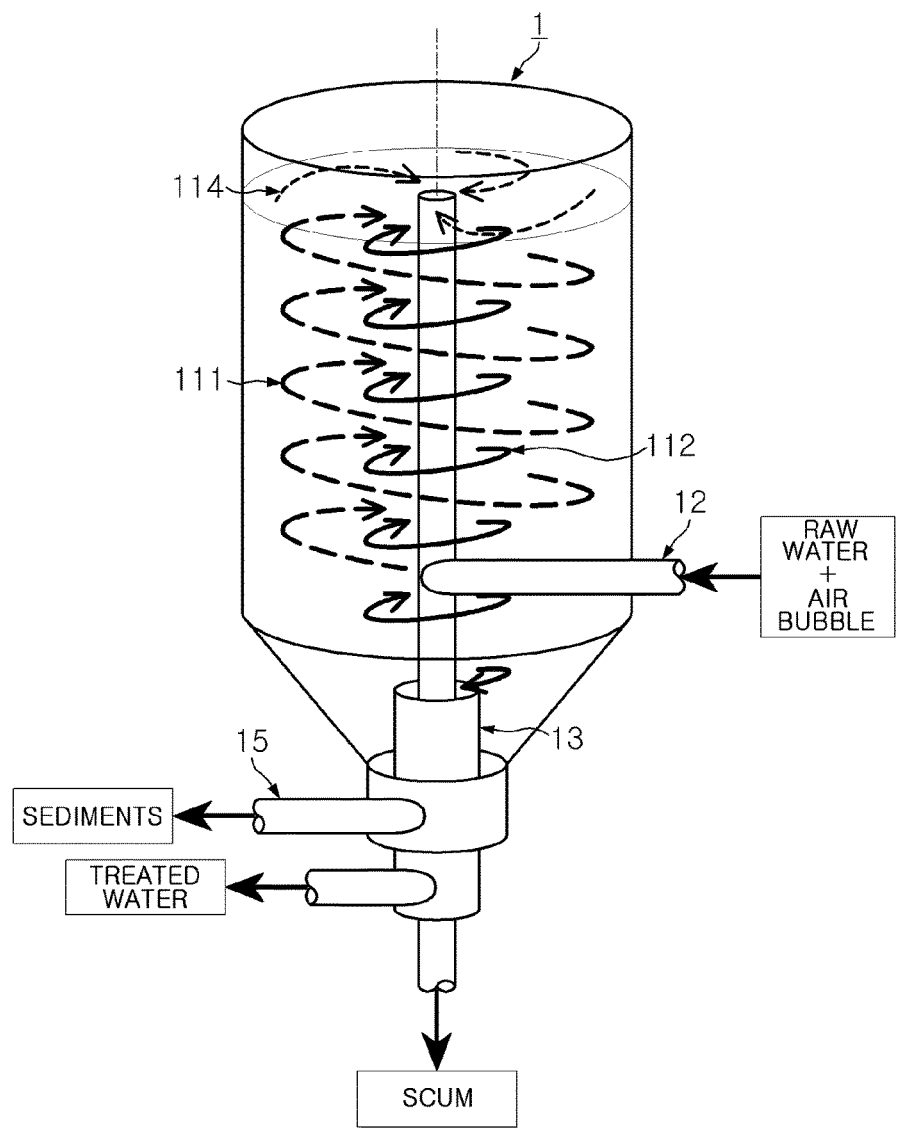
FIG. 4 is a perspective view illustrating a flow path of raw water introduced into the separation tank.

In the first embodiment having the structure described above, when raw water and water that contains air bubbles are simultaneously and continuously supplied to the separation tank 11 by the raw water pump 21 and the bubble supplier 3, as illustrated in FIG. 4, feed water forms a swirling flow that swirls along the inside wall of the separation tank 11 (i.e. swirls in a relatively outer side within the separation tank 11) due to its kinetic energy. Since the swirling flow contains air bubbles, it has a relatively low density. Therefore, it forms an ascending flow that flows along a helical ascending flow path 111 of raw water as well as it swirls. During this process, suspended material adheres to the air bubbles and thus floats to the surface of water along with the air bubbles. Then the floated suspended material 114a moves along the flow path 114 of floated scum, gathering at the center of the swirling flow. After that, the suspended material overflows into the scum outflow pipe 14 and is thus removed from raw water.

Figure 5:
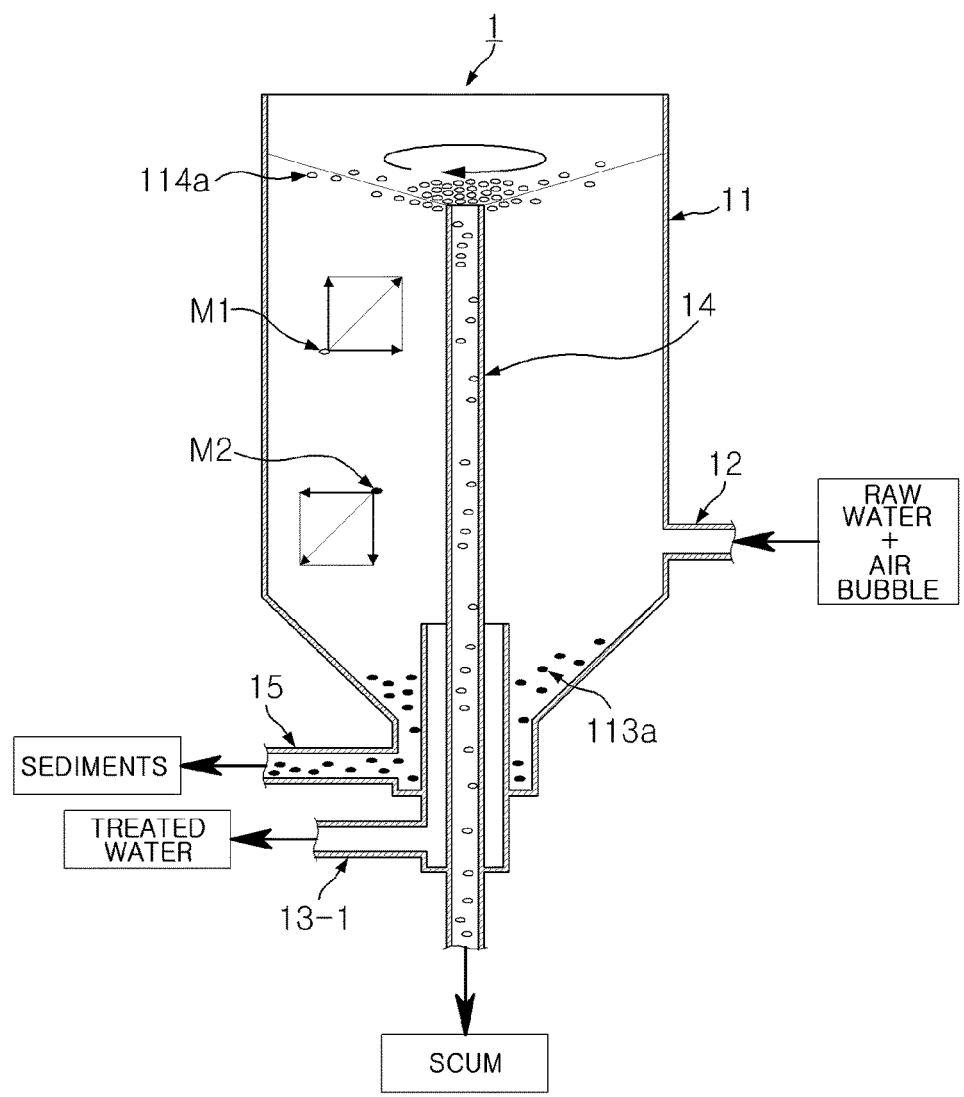
FIG. 5 is a front view illustrating behaviors of scum and sediments in the separation tank of FIG. 2.

The scum that ascends in the separation tank 11 is continuously floated by air bubbles that are newly and continuously formed and floated from the bottom of the separation tank 11. For this reason, the scum that is floated does not sink in the separation tank 11. The density of the treated water that lost air bubbles is increased, so that the treated water forms a descending flow path 112 at a center portion of the separation tank 11 while flowing along an outer side within the scum outflow pipe 14. After the treated water swirls and descends, it is discharged outside through an outlet of the treated water outflow pipe 13. At this point, as illustrated in FIG. 5, scum M1 adhered to the air bubbles receives gravity force and buoyance attributable to centrifugal force is formed by raw water, thereby floating at the center of the separation tank 11 by buoyance corresponding to the vector sum thereof. On the other hand, sediment particles M2 that are not adhered to the air bubbles do not receive buoyance attributable to the flow of raw water but receive only gravity force and centrifugal force, thereby sinking toward the bottom and the wall of the separation tank 11. Therefore, as compared with conventional dissolved air flotation devices in which only a lateral water flow is formed, separation of suspended material based on flotation and sedimentation relatively rapidly progresses. The scum and sediments that are separated from raw water are collected in the scum tank 4 and the sediment tank 5, respectively.

Figure 7:
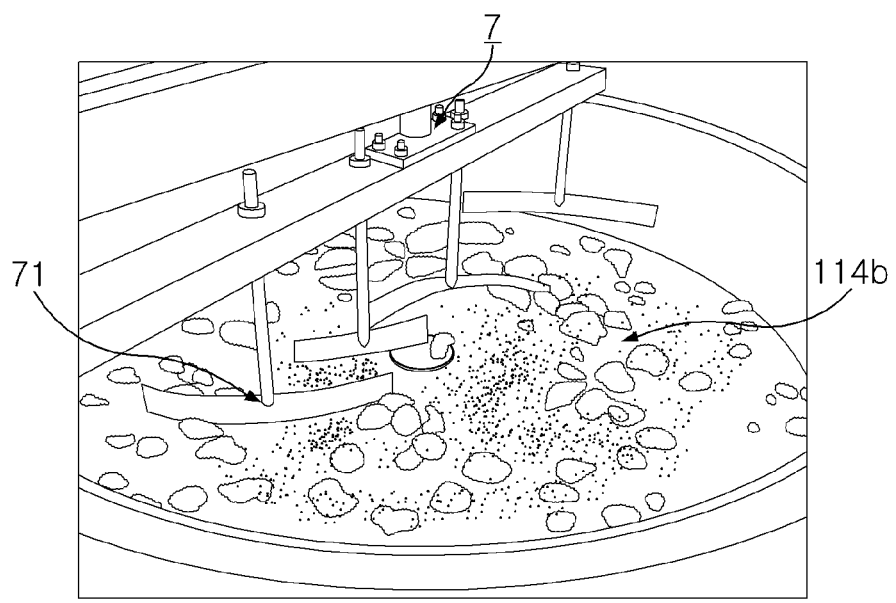
FIG. 7 is a perspective view illustrating the separation tank of FIG. 2 that is equipped with a scum scrapper.

The concentration of the sediments discharged during operation of the separation tank can be adjusted by adjusting an opening, such as a gate valve, of the sediment discharge adjustment plate 15-1. For example, a predetermined treated water outflow adjustment means that uses a U-shaped pipe may be used. The concentration of the scum to be discharged can be adjusted by adjusting the water level in the separation tank 11 in a manner of changing an opening of the treated water outflow adjustment plate 13-2. When the separation process is operated under conditions in which the concentration of scum that floats on the surface of the water in the separation tank 11 is high, viscosity of a scum layer 114b (floated scum) is increased and fluidity of scum is deteriorated. Therefore, the scum may not easily move into the scum outflow pipe 14. For this reason, as illustrated in FIG. 7, a rotatable scum scrapper 7 with blades 71 is installed at an upper end portion of the separation tank 11, so that the scum is forced to move into the scum outflow pipe 14. Alternatively, although not illustrated, a level sensor is installed within the separation tank 11 and is electronically linked with the treated water outflow adjustment plate 13-2, thereby automatically adjusting the adequate water level in the separation tank.

Preferably, the first embodiment may be used to remove suspended material that is apt to adhere to micro-air bubbles, for example, activated sludge, oil, surfactants, blue-green algae, algae oil, protein, etc. In this case, separation time (i.e. retention time in the separation tank 11) is normally about 5 to 10 minutes.

Figure 6:
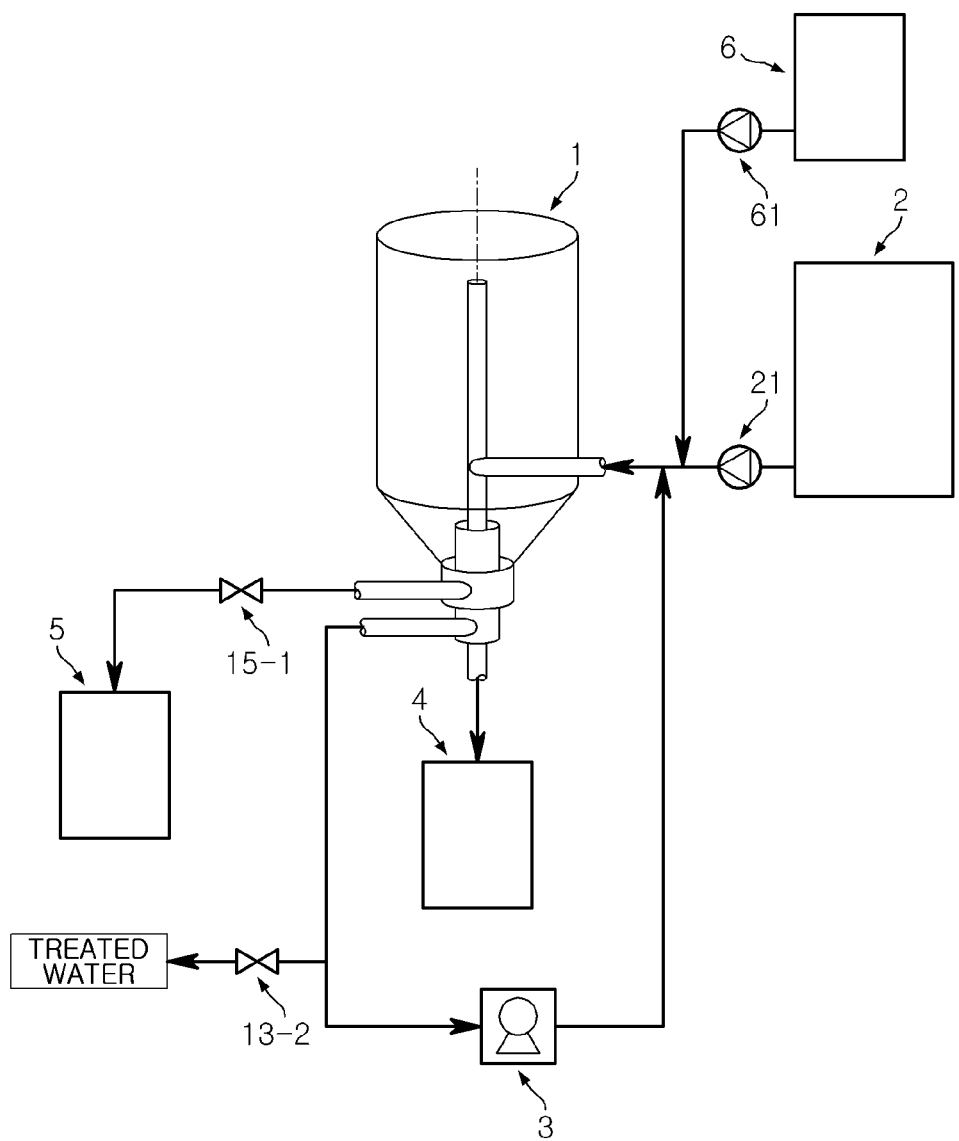
FIG. 6 is a dissolved air flotation device according to a second embodiment of the present invention.

FIG. 6 is a diagram illustrating a dissolved air flotation device according to a second embodiment of the present invention.

As illustrated in FIG. 6, the dissolved air flotation device according to the second embodiment is different from the first embodiment only in that it additionally includes a chemical supply pump 61 that supplies chemicals such as flocculants in a predetermined amount while raw water is transported to the separation tank 11, and a chemical tank 6 that stores chemicals therein. The device according to the second embodiment is the same as the device according to the first embodiment in terms of the other construction and operation.

The chemical supply pump 61 and the chemical tank 6 may be a means that can supply chemicals that can increase flotation and sedimentation efficiencies by flocculating suspended material in raw water and modifying the surface of air bubbles. For example, chemicals that are used may include one or more components selected from inorganic chemicals such as polyaluminum chloride, aluminum sulfate, or caustic soda; polymer flocculants such as polyamide or poly DADMAC; and anionic, non-ionic or cationic surfactants such as sodium alkyl sulfonate, polyoxyethylene oleylether, and fatty acid sulfate. These chemicals may be supplied by using respective chemical supply pumps 61 or may be supplied in the form of a mixture of chemicals. When the speed of flocculation or adsorption reactions caused by these chemicals is low, raw water to be treated and chemicals are mixed first and then a mixture of the raw water and chemicals may be introduced into a reaction aging tank (flocculation tank) before it is introduced into the separation tank. In this way, separation efficiency can be increased.

The second embodiment may be used to remove suspended material that is not apt to adhere to micro-air bubbles, for example, microalgae or inorganic micro-particles contained in muddy water or stone-polishing waste water. Kinds or using methods of chemicals may be determined according to characteristics of material to be removed.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A dissolved air flotation device for treating water, comprising:
    a raw water supply means (2, 21) adapted to supply raw water for treatment;
    a separation tank (11) including an upper body portion of a circular cross section, a raw water inlet (11a) formed at a lower side of the upper body portion, the raw water inlet being open in a tangential direction at a lower side of the upper body portion and to which a raw water inflow pipe (12) is connected such that raw water supplied by the raw water supply means (2, 21) swirls and flows in a spiral direction within the upper body portion of the separation tank as the raw water is introduced into the upper body portion of the separation tank through the raw water inflow pipe (12);
    the separation tank (11) further including a lower body portion of circular cross section with a diameter smaller than that of the upper body portion, and the lower portion having a treated water outlet (11b) to which a treated water outflow pipe (12) that vertically extends and has a circular cross section is connected, and a sediment discharge outlet (11c) through which sediments on a bottom of the separation tank are discharged outside;
    a scum outflow pipe (14) that has a circular cross section and vertically extends through the separation tank while passing through a center axis of the treated water outflow pipe (13); and
    a bubble supplier (3) configured to supply air bubbles to the separation tank raw water flowing along the raw water inflow pipe (12) such that a mixture of the raw water and air bubbles is introduced into the upper body portion of the separation tank (11), wherein the raw water and air bubbles ascend while forming a swirling flow around an outer circumferential area within the upper body portion, while contaminants adhered to air bubbles are floating and gathered at an upper surface of water and then removed through the scum outflow pipe (14), and wherein treated water forms a descending swirling flow along an inner central area of the separation tank and is discharged through the treated water outflow pipe (13), wherein the separation tank (11), the treated water outflow pipe (13), and the scum outflow pipe (14) all are concentrically arranged with respect to a center axis of the separation tank (11).

2. The dissolved air flotation device according to claim 1, further comprising:
    a treated water outflow adjustment means (13-2) that adjusts a flow rate of treated water discharged from the separation tank (11); and
    a sediment discharge adjustment means (15-1) that adjusts a flow rate of sediments discharged from the separation tank (11),
    wherein an upper end of the scum outflow pipe (14) is located under a surface of water within the separation tank (11).

3. The dissolved air flotation device according to claim 1, wherein the raw water inlet (11a) is located at a height that is 10 to 60% of a total height from the sediment discharge outlet (11c) to the upper end of the scum outflow pipe (14).

4. The dissolved air flotation device according to claim 1, further comprising a rotatable scrapper (7) that collects scum floating above the scum outflow pipe (14).

5. The dissolved air flotation device according to claim 1, further comprising a water treatment chemical supply means (6, 61) connected to the raw water inflow pipe (12).

* * * * *